United States Patent
Lu

(10) Patent No.: US 10,436,257 B2
(45) Date of Patent: Oct. 8, 2019

(54) METHOD OF FIXING A DAMPER FLANGE TO A DAMPER HUB

(71) Applicant: Schaeffler Technologies AG & Co. KG, Herzogenaurach (DE)

(72) Inventor: Phong Lu, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 914 days.

(21) Appl. No.: 14/803,325

(22) Filed: Jul. 20, 2015

(65) Prior Publication Data

US 2016/0025154 A1 Jan. 28, 2016

Related U.S. Application Data

(60) Provisional application No. 62/029,336, filed on Jul. 25, 2014.

(51) Int. Cl.
*F16D 13/68* (2006.01)
*F16D 13/64* (2006.01)
*F16F 15/12* (2006.01)
*F16D 1/072* (2006.01)

(52) U.S. Cl.
CPC ............ *F16D 13/646* (2013.01); *F16F 15/12* (2013.01); *F16F 15/1203* (2013.01); *F16D 1/072* (2013.01); *F16D 13/68* (2013.01); *F16D 2250/0061* (2013.01)

(58) Field of Classification Search
CPC .. F16D 13/644; F16D 13/646; F16D 2300/22; F16D 13/68; F16F 15/12
See application file for complete search history.

(56) References Cited

U.S. PATENT DOCUMENTS

| 4,560,366 | A | * | 12/1985 | Loizeau | F16D 13/686 192/205 |
| 5,673,598 | A | * | 10/1997 | Duclos | F16C 33/201 192/70.17 |
| 8,840,481 | B2 | * | 9/2014 | Yamamoto | F16F 15/134 464/68.41 |
| 2008/0110719 | A1 | * | 5/2008 | Saeki | F16F 15/129 192/109 A |

* cited by examiner

*Primary Examiner* — Huan Le
(74) *Attorney, Agent, or Firm* — Davidson, Davidson & Kappel, LLC

(57) ABSTRACT

A method of forming a damper assembly for a motor vehicle drive train is provided. The method includes providing a damper flange including a pocket at an inner circumferential surface thereof and cutting an outer circumferential surface of a damper hub using the inner circumferential surface of the damper flange. The cutting results in a displaced damper hub material of the outer circumferential surface of the damper hub being displaced into the pocket. A damper assembly also provided that includes a damper flange including a pocket at an inner circumferential surface thereof and a damper hub including an outer circumferential surface fixed to the inner circumferential surface of damper flange. The outer circumferential surface of the damper hub includes a displaced damper hub material extending radially into the pocket.

7 Claims, 4 Drawing Sheets

METHOD OF FIXING A DAMPER FLANGE TO A DAMPER HUB

This claims the benefit to U.S. Provisional Patent Application No. 62/029,336 filed on Jul. 25, 2014, which is hereby incorporated by reference herein.

The present disclosure relates generally to damper assemblies and more specifically to methods for fixing damper flanges to damper hubs.

BACKGROUND

FIGS. 1a to 1c show a conventional method of forming a damper assembly 10, specifically forming a flange-hub sub-assembly of damper assembly 10 formed by staking a damper flange 11 onto a damper hub 12. Damper hub 12 is formed of a forging material and damper flange 11 is formed of a case hardened stamped flange for forging damper hub 12. As damper flange 11 is pressed onto damper 12, an inner circumferential splined surface 14 of damper flange 11 spline cuts an outer circumferential surface 16, displacing material 18 (i.e., creating chips), of outer circumferential surface 16 of damper hub 12. Damper hub 12 is provided with a chip pocket 20 at outer circumferential surface 16 to receive displaced material 18. Following the storage of displaced material 18 in pocket 20, damper hub 12 is staked or coined to fix damper flange 11 axially on damper hub 12.

FIG. 1d shows a damper sub-assembly 80 including a damper flange 82 and a damper hub 84 integrally formed together in a one-piece design that typically requires more processing (machining and stamping) than damper assembly 10 and is typically more costly than the hub design 10.

SUMMARY OF THE INVENTION

A method of forming a damper assembly for a motor vehicle drive train is provided. The method includes providing a damper flange including a pocket at an inner circumferential surface thereof and cutting an outer circumferential surface of a damper hub using the inner circumferential surface of the damper flange. The cutting results in a displaced damper hub material of the outer circumferential surface of the damper hub being displaced into the pocket.

A damper assembly for a motor vehicle drive train is also provided. The damper assembly includes a damper flange including a pocket at an inner circumferential surface thereof and a damper hub including an outer circumferential surface fixed to the inner circumferential surface of damper flange. The outer circumferential surface of the damper hub includes a displaced damper hub material extending circumferentially into the pocket.

BRIEF DESCRIPTION OF THE DRAWINGS

The present invention is described below by reference to the following drawings, in which.

DETAILED DESCRIPTION

Figure 1A:
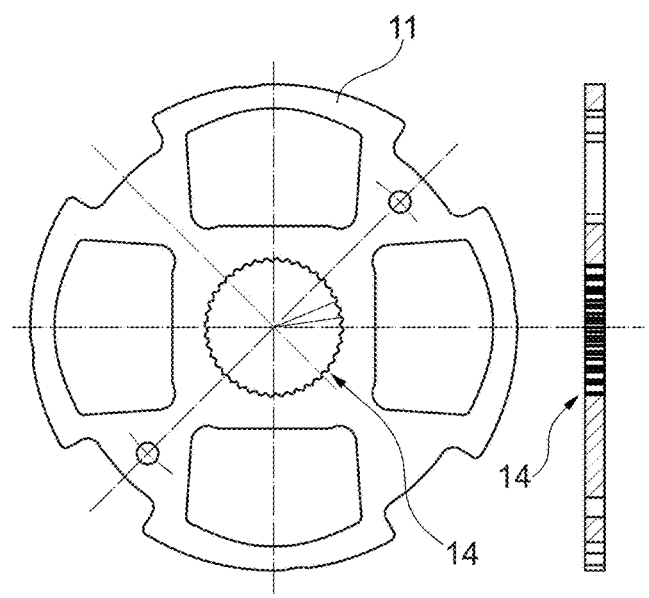
FIGS. 1a to 1c show views of a conventional method of forming a damper assembly by staking a damper flange onto a damper hub.
Figure 1B:
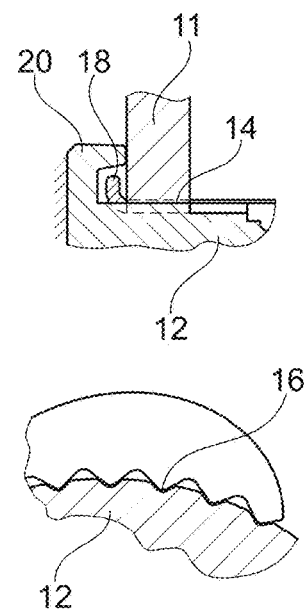
Figure 1C:
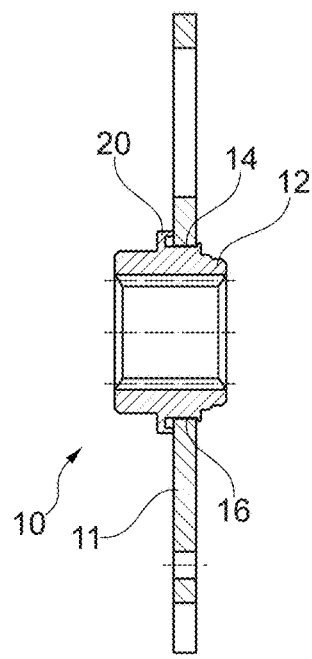
Figure 1D:
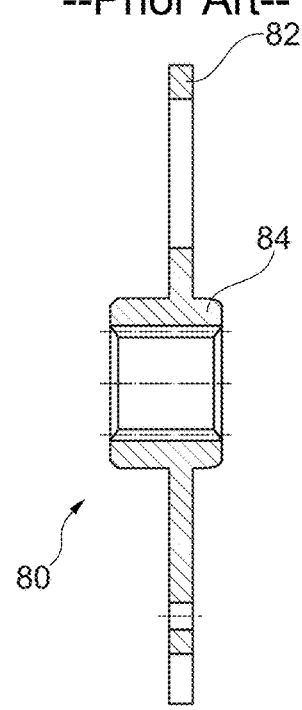
FIG. 1d shows a cross-sectional side view of a conventional damper sub-assembly.
Figure 2A:
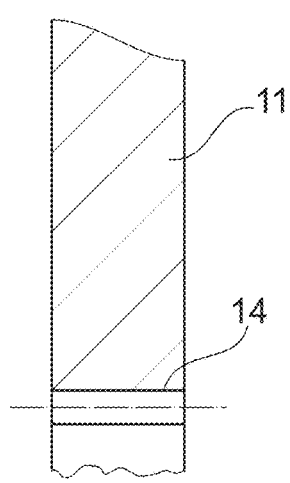
FIG. 2a shows a partial cross-sectional side view of an inner circumferential surface of the conventional damper flange and FIG. 2b shows a partial cross-sectional side view of the conventional damper hub shown in FIGS. 1a to 1c.
Figure 2B:
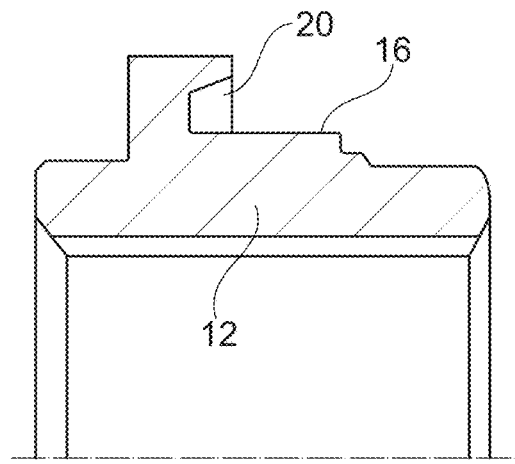

FIG. 2a shows a partial cross-sectional side view of conventional damper flange 11 and FIG. 2b shows a partial cross-sectional side view of conventional damper hub 12 described in FIGS. 1a to 1c. Inner circumferential splined surface 14 of damper flange 11 has a constant radius as viewed side cross-sectionally, because as noted above, chip pocket 20 is provided on damper hub 12. Damper hub 12 is provided with pocket 20 on outer circumferential surface 16 for receiving chips when damper flange 11 is connected to damper hub 12, as discussed below with respect to FIG. 4.

Figure 3A:
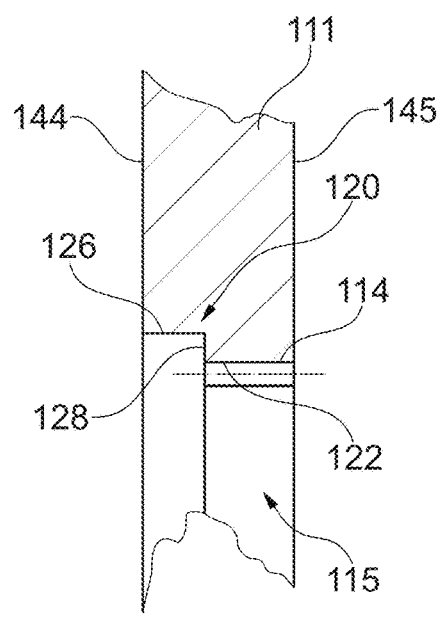
FIG. 3a shows a partial cross-sectional side view of a damper flange and FIG. 3b shows a partial cross-sectional side view of a damper hub in accordance with an embodiment of the present invention.
Figure 3B:
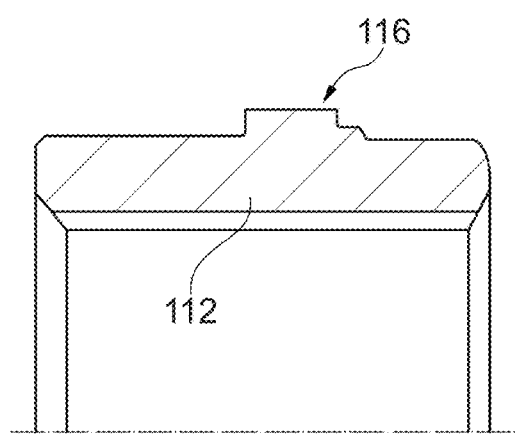
Figure 5:
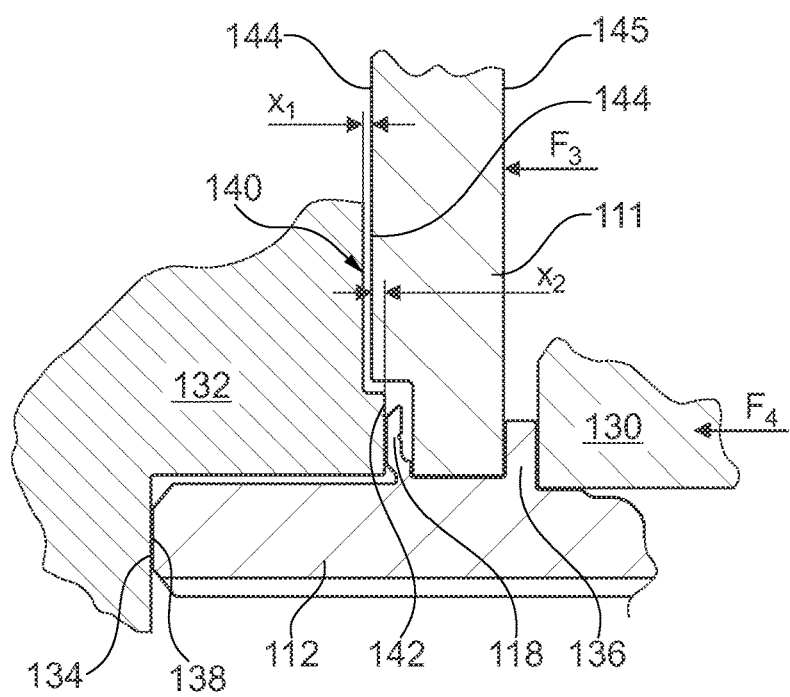
FIG. 5 shows a partial cross-sectional side view of a method of forming a damper assembly in accordance with an embodiment of the present invention.

FIG. 3a shows a partial cross-sectional side view of a damper flange 111 and FIG. 3b shows a partial cross-sectional side view of a damper hub 112 in accordance with an embodiment of the present invention. Damper flange 111 includes an inner circumferential surface 115 having a stepped inner radius as viewed side cross-sectionally—to provide a pocket 120 for receiving material displaced by using damper flange 111 to spline cut a damper hub 112 (FIG. 5). Pocket 120 may be formed by machining a radially and circumferentially extending groove into inner circumferential surface 115. Inner circumferential surface 115 of damper flange 111 includes a first section 122, which is splined, for contacting an outer circumferential surface 116 of damper hub 112 and a second section 126, which is smooth and does not includes splines, radially offset from first section 122. Second section 126 defines an outer radius of pocket 120 and connects with a first axial surface 144 of damper flange 111. As a result of pocket 120, first axial surface 144 of damper flange has a shorter radial length than a second axial surface 145 of damper flange 111 opposite of first axial surface 144. First section 122 of inner circumferential surface 115 connects with second axial surface 145. Damper flange 111 also includes a radially extending section 128 connecting first section 122 and second section 126 of inner circumferential surface 114. In this embodiment, first and second sections 122, 126 extend parallel to each other and to a center axis of damper flange 111, which damper flange 111 rotates about during operation of damper assembly 110, and radially extending section 128 extends perpendicular to the center axis of damper flange 111. Because damper flange 111 is provided with pocket 120 for receiving chips when damper flange 111 is connected to damper hub 112, as discussed below with respect to FIG. 5, damper hub 112 does not include a pocket for receiving chips on outer circumferential surface 116.

Figure 4:
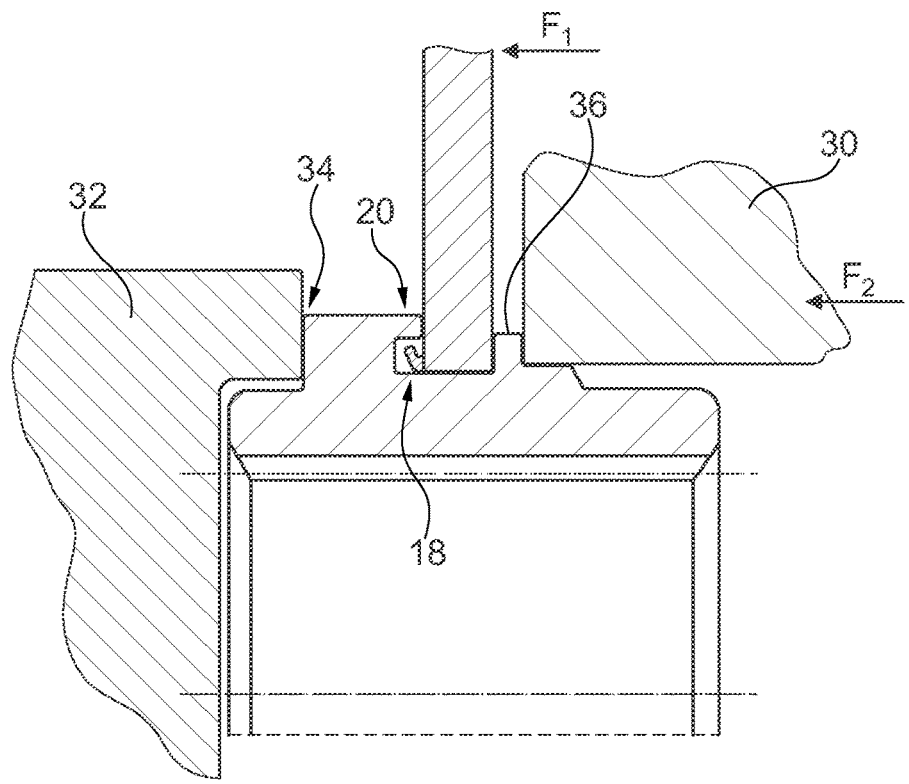
FIG. 4 shows a partial cross-sectional side view illustrating further details of the method of forming the damper assembly shown in FIGS. 1a to 1c.

FIG. 4 shows further details of the method of forming damper assembly 10 shown in FIGS. 1a to 1c, specifically forming a flange-hub sub-assembly of damper assembly 10. As noted above, damper hub 12 is provided with a pocket 20 on outer circumferential surface 16. Damper flange 11 is axially pressed onto outer circumferential surface 16 of damper hub 12 with a force F1 such that damper flange 11, by inner circumferential splined surface 14, cuts splines into outer circumferential surface 16. An axial surface of pocket 20 acts as a backstop for damper flange 11 during the pressing and displaced material 18 of damper hub 12 is displaced into pocket 20. After damper flange 11 is pressed onto damper hub 12, staking tooling, in the form of a staking section 30 and a support section 32, is used to stake damper hub 12 to fix damper flange 11 axially in place on damper hub 12. Damper hub 12 is held against support section 32 such that support section 32 contacts a stop surface 34 of damper hub 12 adjacent to pocket 20. Staking section 30, on the opposite side of damper hub 12 as support section 32, is then pressed against damper hub 12 with a force F2 to displace further material of outer circumferential surface 14 to form a radially extending lip 36. After the staking, damper flange 11 is axially fixed on damper hub 12 and sandwiched between the axial surface of pocket 20 and radially extending lip 36.

FIG. 5 shows a method of forming a damper assembly 110 in accordance with an embodiment of the present invention, specifically forming a flange-hub sub-assembly of damper assembly 110. Damper hub 112 is formed of a forging material and damper flange 111 is formed of a case hardened stamped flange for forging damper hub 112. As damper flange 111 is pressed onto damper 112, an inner circumferential splined surface 114 of damper flange 111 spline cuts an outer circumferential surface 116, axially and radially displacing material 118 (i.e., creating chips) of an outer circumferential surface 116 of damper hub 114.

As noted above, damper flange 111 includes an inner circumferential surface 115 having a stepped inner radius as viewed side cross-sectionally—to provide a pocket 120 for receiving material displaced by using damper flange 111 to spline cut damper hub 112. Damper flange 111 is axially pressed onto outer circumferential surface 116 of damper hub 112 with a force F3 such that damper flange 111, by inner circumferential splined surface 114, cuts splines into an outer circumferential surface 116 of damper hub 112. Before flange 111 is pressed onto hub 112, first axial support surface 134 of support section 132 of a staking tooling contacts an axial outermost edge 138 of damper hub 112. Then, damper flange 111 is axially pressed onto outer circumferential surface 116 of damper hub 112 with force F3 to spline cut damper hub 111 and displace material 118. After flange 111 has been pressed onto hub 112, a second axial support surface 140 is axially spaced from first axial surface 144 of damper flange 111 by a distance X1. A third axial surface 142 of support section 132 acts as a backstop for a displaced material 118 of damper hub 112, which is formed by the cutting of outer circumferential surface 116 of damper hub 112. Third axial surface 142 is positioned inside pocket 120 at the end of the spline cutting and third axial surface 142 is axially offset from first axial surface 144 of damper flange by a distance X2. The formation of displaced material 118 and the contact between displaced material 118 and third axial surface 142 axially spaces second axial support surface 140 from first axial surface 144 of damper flange 111 by distance X1. Accordingly, support section 132 is formed such that axial surface 142 protrudes axially from support surface 140 by a distance equal to X1+X2, ensuring that displaced material 118 is always held away from the plane of axial surface 144.

After damper flange 111 is pressed onto damper hub 112, staking tooling, in the form of a staking section 130 and support section 132, is used to stake damper hub 112 to fix damper flange 111 axially in place on damper hub 112. Support section 132 contacts the displaced damper hub material 118 at a first axial side first axial side of damper flange 111 including pocket 120 and staking section 130 coins damper hub 112 against a second axial side of damper flange 111 opposite the first axial side to form a coined damper hub section and a radially extending lip 136. Damper hub 112 is held against support section 132 such that support surface 138 contacts axial outermost edge 138 of damper hub 112 and support surface 142 contacts displaced material 118. Staking section 130, on the opposite side of damper hub 112 as support section 132, is pressed against damper hub 112 with a force F4 to displace further material of outer circumferential surface 114 to form radially extending lip 136, which contacts second axial surface 145 of damper flange 111. After the staking, damper flange 111 is axially fixed on damper hub 112 and sandwiched between and contacting the displaced material 118 and radially extending lip 136. The staking may cause axial surface 140 of support section 132 to contact axial surface 144 of flange 111.

Figure 6:
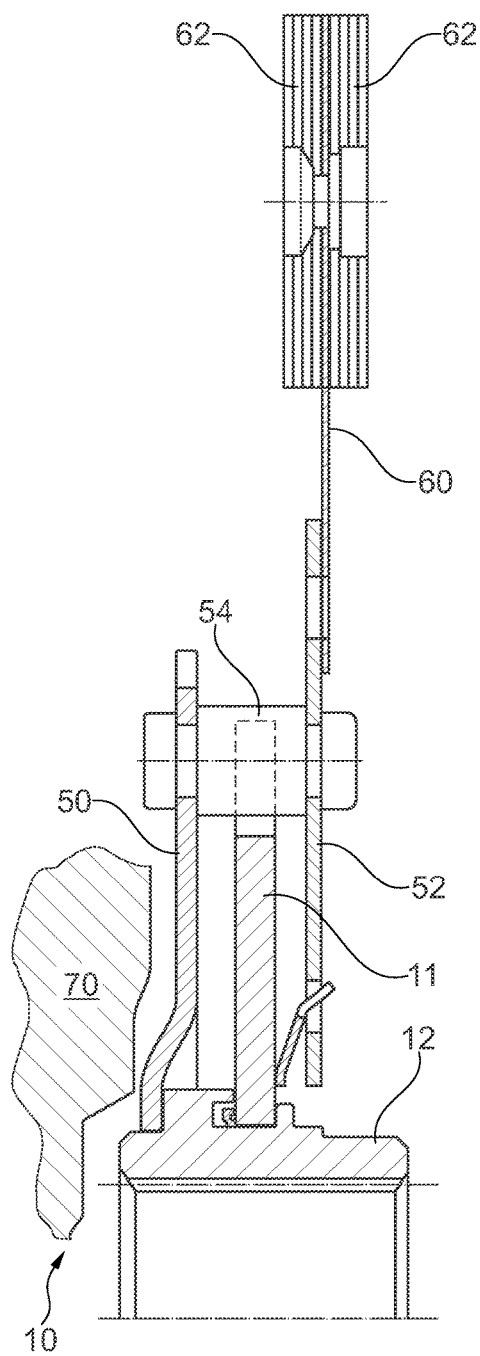
FIG. 6 shows a partial cross-sectional side view of further details of damper assembly shown in FIGS. 1a to 1c and 4.

FIG. 6 shows further details of damper assembly 10 shown in FIGS. 1a to 1c and 4. In addition to damper flange 11 and damper hub 12, damper assembly 10 includes a first cover plate 50 contacting damper hub 12 adjacent to pocket 20 on a first axial side of damper flange 11 and a second cover plate 52, which is fixed to cover plate 50 by fasteners 54, on a second axial side of damper flange 11 opposite the first axial side. Cover plates 50, 52 support damping elements, for example springs, for driving flange 11. A clutch disc 60 including friction material 62 on both sides thereof is connected to second over plate 52.

Figure 7:
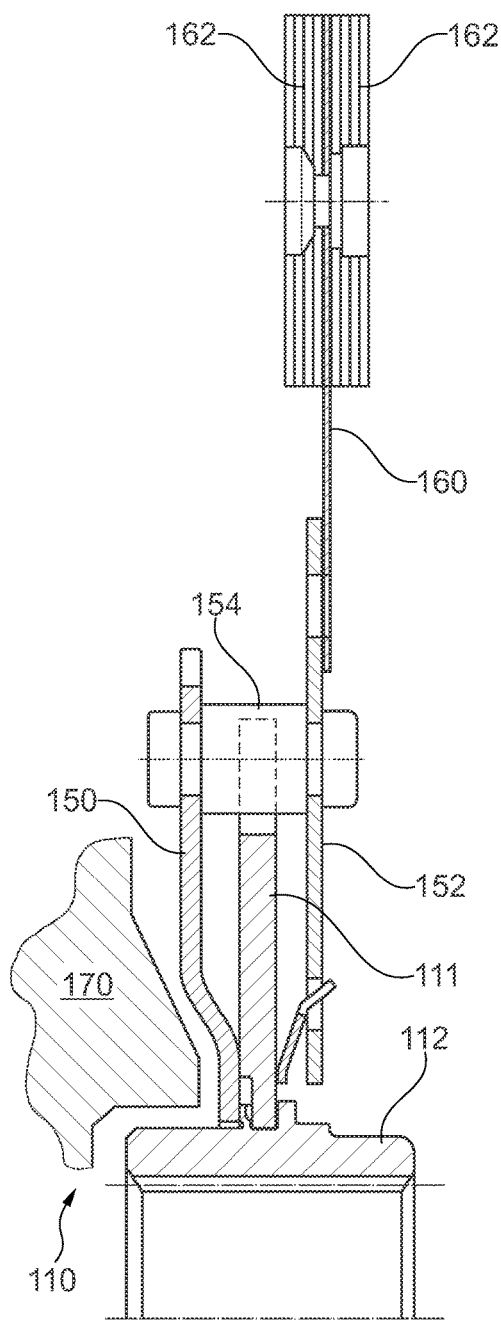
FIG. 7 shows a partial cross-sectional side view of further details of the damper assembly shown in FIG. 5.

FIG. 7 shows further details of damper assembly 110 shown in FIG. 5. In addition to damper flange 111 and damper hub 112, damper assembly 110 includes a first cover plate 150 contacting damper hub 112 adjacent to pocket 120 on a first axial side of damper flange 111 and a second cover plate 152, which is fixed to cover plate 150 by fasteners 154, on a second axial side of damper flange 111 opposite the first axial side. Cover plates 150, 152 support damping elements, for example springs, for driving flange 111. A clutch disc 160 including friction material 162 on both sides thereof is connected to damper flange 111 via second cover plate 152. A comparison of the damper assembly 110 of FIG. 7 with the damper assembly of FIG. 6 illustrates that damper assembly 110 advantageously takes up less axial space than damper assembly 10. Damper assembly 110 thus has a more preferred installation boundary 170 than an installation boundary 70 of damper assembly 10.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A damper assembly for a motor vehicle drive train comprising:
   a damper flange including a pocket at an inner circumferential surface thereof; and
   a damper hub including an outer circumferential surface fixed to the inner circumferential surface of damper flange, the outer circumferential surface of the damper hub including a displaced damper hub material extending radially into the pocket.

2. The damper assembly as recited in claim 1 wherein the inner circumferential surface of the damper flange includes a first section contacting the outer circumferential surface of the damper hub and a second section radially offset from the first section, the second section defining an outer radius of the pocket.

3. The damper assembly as recited in claim 2 wherein the damper flange further includes a radially extending section connecting the first section and the second section of the inner circumferential surface.

4. The damper assembly as recited in claim 1 wherein the damper hub includes a lip radially extending at the outer circumferential surface thereof, the damper flange being sandwiched between the lip and the displaced damper hub material.

5. The damper assembly as recited in claim 1 further comprising a first cover plate fixed against the damper flange at a first axial side of the damper flange including the pocket.

6. The damper assembly as recited in claim 5 further comprising a second cover plate fixed against a second axial side of the damper flange opposite the first axial side.

7. The damper assembly as recited in claim 6 further comprising a clutch disc connected to the damper flange.

\* \* \* \* \*